July 16, 1946.    T. P. TAPPER    2,404,013
REMOVABLE MANDREL FOR BELT STRETCHERS
Filed Aug. 24, 1944
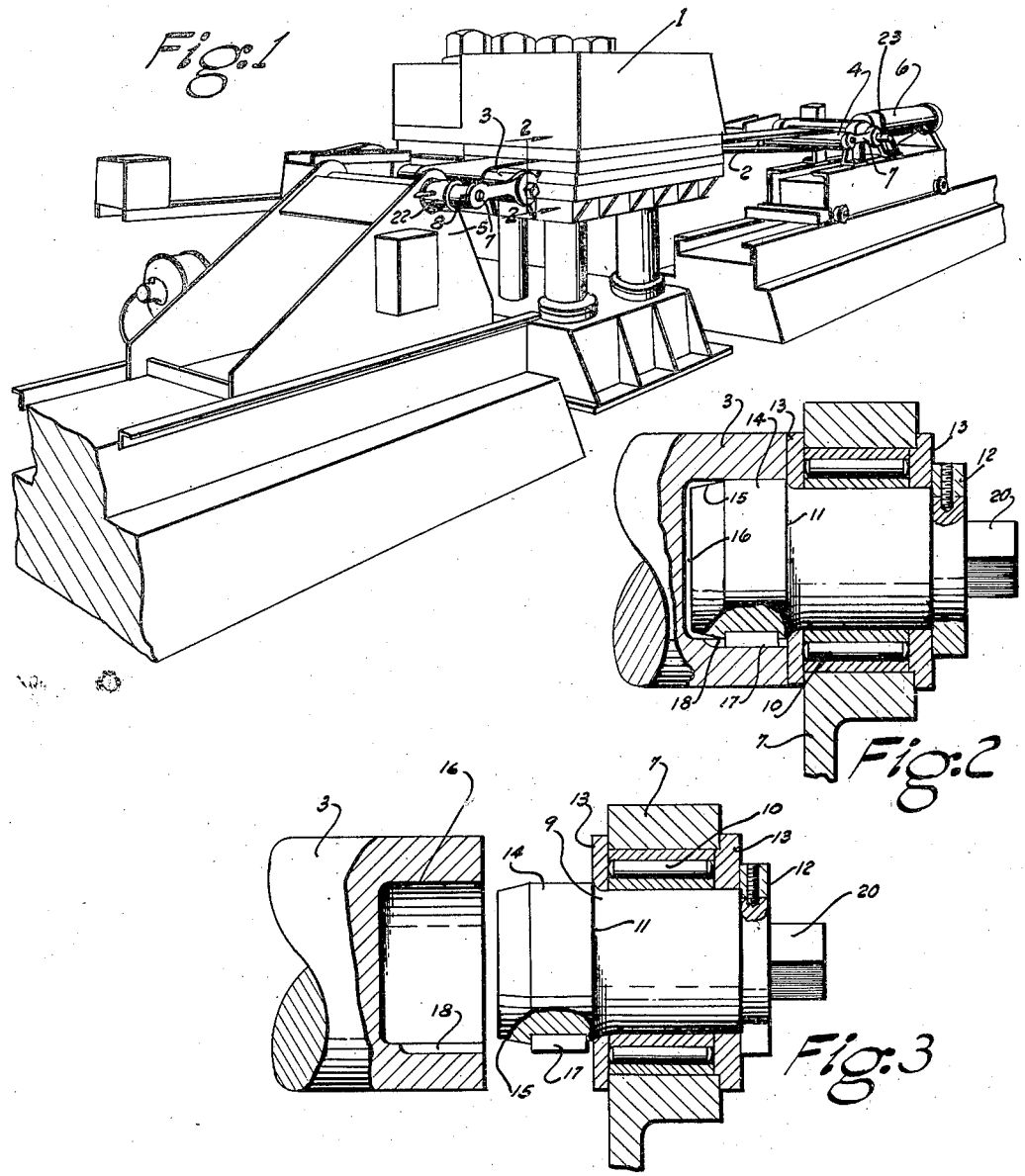
INVENTOR
Thomas P. Tapper
BY
ATTORNEY Patented July 16, 1946

2,404,013

UNITED STATES PATENT OFFICE 2,404,013

REMOVABLE MANDREL FOR BELT STRETCHERS

Thomas P. Tapper, Prospect Park, Pa., assignor to The Baldwin Locomotive Works, a corporation of Pennsylvania Application August 24, 1944, Serial No. 551,022

2 Claims. (Cl. 74—216.5)

This invention relates generally to belt stretchers and more particularly to a separable roller structure for allowing an endless belt to be pushed onto or taken off of stretcher rollers which are associated with a belt vulcanizing press, although my invention may be applicable to other fields of use.

In the manufacture of endless belts which are made of certain kinds of moldable materials such as rubber and fabric compositions, it is necessary to stretch the belt during vulcanization of one section thereof and then shift the belt to vulcanize the next section and so on until the belt is fully cured. The stretcher mechanism usually consists of two rollers one located in a fixed position on one side of the press and the other located on the opposite side and being bodily movable in a direction lengthwise of the belt for stretching purposes. After the belt is vulcanized it is customary to remove one of the pivotal arms which support each roller in order to slide the belt off the end of the rollers whereupon an uncured belt is placed over the rollers and the arms replaced. These arms and their roll bearings must be removed and replaced for each belt that is manufactured so that over the course of time the repeated disassembly and assembly has heretofore caused excessive wear or looseness between the bearings and arms thereby resulting in inaccurate positioning of the roller in the arms and consequent distortion or operating disalignment of the belts when placed in service. The wearing of the separable parts in prior art arrangements has been further aggravated by the fact that equipment of this character often operates in dust ladened air so that the bearings might be readily exposed to such foreign matter and this presents a particularly troublesome problem if anti-friction bearings are used for the rollers.

It is an object of my invention to provide improved means for removably supporting one end of a roller whereby the support may be repeatedly removed or replaced while faithfully maintaining accurate positioning of the roller over long periods of use.

Another object is to provide improved roller supporting means that is economical in construction, operation and maintenance combined with ruggedness and ease of manipulation during separation of the roller from its supporting means.

Other objects and advantages will be more apparent to those skilled in the art from the following description of the accompanying drawing in which:

Fig. 1 is a perspective of a vulcanizing press with my improved belt stretcher incorporated therein;

Fig. 2 is an enlarged sectional view through my improved roller supporting means taken substantially on the line 2—2 of Fig. 1; and Fig. 3 is a view similar to Fig. 2 but showing the roller and supporting arm separated.

In the illustrated embodiment of my invention I have shown a usual and well-known type of press 1 for vulcanizing successive sections of an endless belt 2. The belt is mounted upon two pairs of rollers 3 and 4 located on opposite sides of the press 1 and these rollers are part of a mechanism for stretching the belt during curing in the press thereby to insure that the belt will be free from distortion and will run in alignment when placed in service. The roller 3 is supported upon a stationary support 5 while the roller 4 can be bodily shifted to stretch the belt by a hydraulic piston and cylinder motor 6. Each roller is pivotally supported by a pair of arms 7 located at opposite ends of the rollers and whose outer ends are pivoted at 8 while their other ends are connected to the rollers by bearings.

Inasmuch as it is necessary to disconnect one of the arms from each of the rollers in order to laterally shift the belt off of or on to the rollers, I have provide my improved separable connecting means and bearing structure consisting of a mandrel 9 journalled in an anti-friction bearing such as a roller bearing 10 permanently disposed within a suitable bore of the arm 7. The mandrel 9 has a suitable shoulder 11 and collar 12 to engage end plates 13 of the anti-friction bearing while the inner end of the mandrel has preferably an enlarged head 14 and tapered surface 15 adapted to be received with a removably snug fit in a recess 16 of the roller. A key 17 fits in a suitable keyway 18 of the recess to permit rotation of the roller and longitudinal movement of the belt in the press by application of a wrench to a squared portion 20 on the outer end of the mandrel 9.

In operation, when it is desired to remove a belt from the rollers the inner pivot 8 of the arm is moved axially on a well-known bearing support 22 of roller 3 or on a shaft 23 of roller 4, thereby causing mandrel 9 to be bodily moved with arm 7 to disengage roller 3. Thereupon the arm 7 may be swung downwardly away from the end of the roller to allow the belt to be slid off of the end or to be placed on the roller as the case may be.

From the foregoing disclosure it is seen that the mandrel 9, anti-friction bearings 10 and arms 7 remain together at all times as a single self-contained unit and hence at no time is there any disassembly of the bearing structure such as was heretofore required in prior art devices whose rollers had stub shafts which slid into and out of the bearing races. This caused wear and mal-adjustment of the bearings which ultimately resulted in inaccurate positioning of the rollers. My improved combination of elements allows the bearing to be properly adjusted with precision at the time of its original manufacture and insures that the bearing will be kept reasonably tight to avoid ingress of dust. At the same time the mandrel 14 can have a suitably accurate fit within recess 16 and if necessary these parts could be heat treated to insure long life and minimum wear but in any case the parts are of such a nature that even if untreated they will remain accurate through long usage with the result that the belts will be uniformly stretched so as to be free of distortion or disalignment when placed in service.

It will of course be understood that various changes in details of construction and arrangement of parts may be made by those skilled in the art without departing from the spirit of the invention as set forth in the appended claims.

I claim:

1. A separable roller and supporting structure therefor comprising, in combination, a roller, an arm for supporting an end thereof, means for pivotally supporting one end of said arm and for allowing axial shifting thereof along its pivotal axis, a bearing disposed in said arm, a mandrel journalled in said bearing, means for permanently maintaining the mandrel in operative relation to the bearing and arm, and separable means for connecting the mandrel and roller together, whereby the arm may be axially shifted to separate the mandrel from the roller while allowing the bearing and mandrel to remain undisturbed in the arm during said axial shifting.

2. The combination set forth in claim 1 further characterized in that the separable connecting means comprises a recess in the end of the roller and an extended portion formed on the mandrel is adapted to be received within the recess to constitute a radial support for the roller.

THOMAS P. TAPPER.